(12) United States Patent
Seo et al.

(10) Patent No.: US 10,162,945 B2
(45) Date of Patent: Dec. 25, 2018

(54) ELECTRONIC DEVICE AND CONTENT PROVIDING METHOD IN ELECTRONIC DEVICE

(71) Applicant: Samsung Electronics Co., Ltd., Gyeonggi-do (KR)

(72) Inventors: Ho-Young Seo, Seoul (KR); Hyung-Jin Bae, Gyeonggi-do (KR); Jin-Hong Jeong, Gyeonggi-do (KR); Jeong-Heui Cho, Gyeonggi-do (KR); Kyung-Hee Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 60 days.

(21) Appl. No.: 15/054,525

(22) PCT Filed: Aug. 26, 2014

(86) PCT No.: PCT/KR2014/007940
§ 371 (c)(1),
(2) Date: Feb. 26, 2016

(87) PCT Pub. No.: WO2015/030467
PCT Pub. Date: Mar. 5, 2015

(65) Prior Publication Data
US 2016/0267259 A1 Sep. 15, 2016

(30) Foreign Application Priority Data
Aug. 26, 2013 (KR) ........................ 10-2013-0101061

(51) Int. Cl.
*G06F 21/00* (2013.01)
*G06F 21/16* (2013.01)
(Continued)

(52) U.S. Cl.
CPC .............. *G06F 21/16* (2013.01); *G06F 21/64* (2013.01); *G06F 21/84* (2013.01); *G06Q 10/101* (2013.01); *G06F 2221/2147* (2013.01)

(58) Field of Classification Search
CPC ...................................................... G06F 21/16
(Continued)

(56) References Cited

U.S. PATENT DOCUMENTS

| 6,970,259 B1* | 11/2005 | Lunt | ...................... G06F 21/608 |
| | | | 358/1.14 |
| 2003/0112273 A1* | 6/2003 | Hadfield | ................ G06Q 10/10 |
| | | | 715/751 |

(Continued)

FOREIGN PATENT DOCUMENTS

| CN | 101472161 A | 7/2009 |
| CN | 101504709 A | 8/2009 |

(Continued)

OTHER PUBLICATIONS

European Search Report dated Mar. 16, 2017.
Chinese Search Report dated Jan. 10, 2018.

*Primary Examiner* — Longbit Chai
(74) *Attorney, Agent, or Firm* — Cha & Reiter, LLC

(57) ABSTRACT

Various embodiments regarding an electronic device and a content providing method in an electronic device are described. An electronic device according to an embodiment comprises: a communication unit configured to transmit content and receive additional information of the content; a control unit configured to acquire information related to the secondary of the content on the basis of the additional information; and a display unit configured to display the content and the information related to the secondary of the content. Other various embodiments are also possible.

22 Claims, 15 Drawing Sheets

(51) Int. Cl.
   *G06Q 10/10*    (2012.01)
   *G06F 21/64*    (2013.01)
   *G06F 21/84*    (2013.01)
(58) Field of Classification Search
   USPC .......................................................... 726/30
   See application file for complete search history.

(56) References Cited

U.S. PATENT DOCUMENTS

| | | |
|---|---|---|
| 2012/0110445 A1 | 5/2012 | Greenspan et al. |
| 2013/0124649 A1 | 5/2013 | Triantos et al. |
| 2013/0167120 A1 | 6/2013 | Amano et al. |
| 2013/0179690 A1 | 7/2013 | Wu |

FOREIGN PATENT DOCUMENTS

| | | |
|---|---|---|
| KR | 10-2008-0021219 A | 3/2008 |
| KR | 10-2011-0041060 A | 4/2011 |
| KR | 10-2011-0075500 A | 7/2011 |
| WO | 2010/113040 A2 | 10/2010 |
| WO | 2013/067439 A1 | 5/2013 |

\* cited by examiner

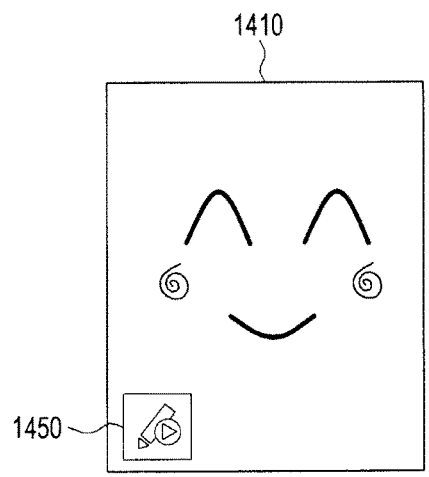
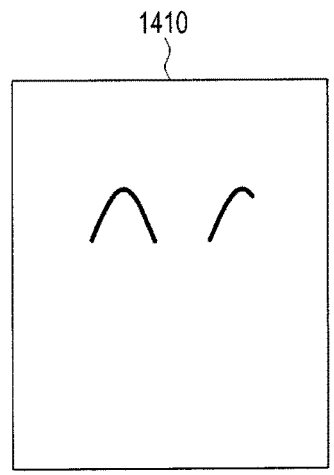
FIG.14A  FIG.14B
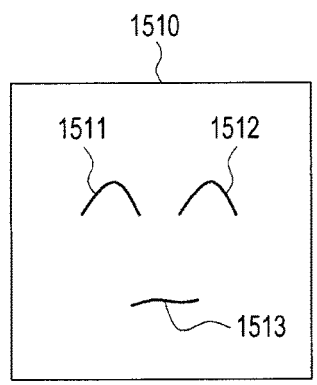
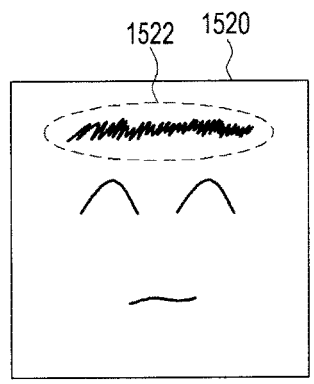
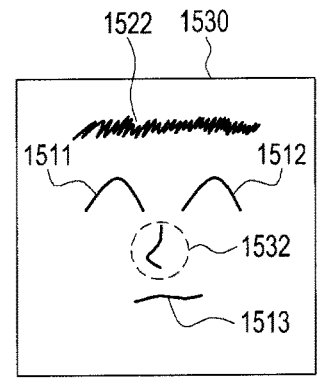
FIG.15A  FIG.15B  FIG.15C

ELECTRONIC DEVICE AND CONTENT PROVIDING METHOD IN ELECTRONIC DEVICE

CLAIM OF PRIORITY

This application is a continuation of PCT/KR filed in the Korean Intellectual Property Office on Aug. 26, 2014 and there duly assigned PCT/KR2014/007940, which in turn claims a priority to an earlier Korean Patent Application No. 10-2013-0101061 filed on Aug. 26, 2013.

TECHNICAL FIELD

Various embodiments of the present disclosure relate to an electronic device and a technique of providing content in the electronic device.

BACKGROUND ART

Lately, many electronic devices have evolved into mobile terminals that individuals can carry, and the functions of the electronic devices also have diversified. Accordingly, an electronic device has various functions for a user's convenience, and can activate functions according to a user's input to execute the functions. For example, the electronic device can provide various applications, wherein the applications can include an application for transmitting/receiving messages through a network, an application for acquiring images through a camera, an application for voice communication, an application for reproducing video, an application for receiving broadcasting signals to provide video or audio programs, and the like.

With diversification of applications that are provided by an electronic device, users' patterns in use of an electronic device are accordingly changing in such a way as to create and provide content using the electronic device from to receive and consume content using the electronic device. For example, many users share content produced by themselves through a Social Network Service (SNS). As representative examples, there are Facebook that provide a service based on personal lives, Instagram that provides a service of sharing pictures photographed by users, YouTube that is a service of sharing video created by users, and Blog that shares information about various matters of interest.

When content is shared, the shared content may be again shared by a plurality of users, or modified in such a way as to be modified or changed. However, in many cases, since an original author or a secondary author of the content is not known, it is difficult to protect rights of the original author of the content. For example, when a user acquires content without permission by downloading or screen-capturing it, and then manipulates the content in such a way as to modulate or modify it to share the modified content, the content is shared without any information about its original author so that the original author's rights cannot be protected.

Also, there is a case in which when an original author's original content is shared, the shared original content is modified by a plurality of users in such a way as to be modified or changed to create many modified content. In such instances, it is difficult to know which part of the original content was modified by what user.

SUMMARY

Accordingly, in various embodiments of the present disclosure, author information including original author information of content may be provided to protect rights of the original author of the content.

Also, in various embodiments of the present disclosure, author information including information about an original author and a secondary author of content may be provided to protect rights of the original author of the content, while providing information about the secondary author.

Also, in various embodiments of the present disclosure, content group information including information about content including modified content produced by modifying original content, as well as content author information may be provided to enable a user to know information about an original author and a secondary author of the content and to know which part of content was modified by what person.

In accordance with an aspect of exemplary embodiments of the present disclosure, there is provided an electronic device including: a communication unit configured to transmit content, and to receive additional information of the content; a controller configured to acquire information related to modification of the content based on the additional information; and a display unit configured to display the content and the information related to the modification of the content, wherein the additional information includes at least one of information about an original author of the content and information about a secondary author of the content.

In accordance with another aspect of exemplary embodiments of the present disclosure, there is provided an electronic device including: a communication unit configured to receive first content; a detector configured to detect original author information from watermark information included in the first content; and a controller configured to detect whether the first content is modified content, based on the result of the detection, and to provide second content including author information of the first content.

In accordance with another aspect of exemplary embodiments of the present disclosure, there is provided a method of receiving content in an electronic device including: transmitting content, and receiving additional information of the content; acquiring information related to modification of the content based on the additional information; and displaying the content and the information related to the modification of the content, wherein the additional information includes at least one of information about an original author of the content and information about a secondary author of the content.

In accordance with another aspect of exemplary embodiments of the present disclosure, there is provided a method of providing content in an electronic device including: receiving first content; detecting an original author from watermark information included in the first content; determining whether the first content is modified content, based on the result of the detection; and providing second content including author information of the first content, wherein the author information includes at least one of information about the original author of the first content and information about a secondary author of the first content.

According to various embodiments of the present disclosure, since a user can know an original author and a secondary author of content when the content is provided, it is possible to protect rights of the original author of the content.

Also, according to various embodiments of the present disclosure, since a user can know which part of original content was modified by what secondary author when content modified from the original content is provided, it is possible to protect rights of the original author of the content.

BRIEF DESCRIPTION OF THE DRAWINGS

FIG. 14A shows an example of a technique for presenting content, according to an embodiment of the present invention;

FIG. 14B shows an example of a technique for presenting content, according to an embodiment of the present invention;

FIG. 15A shows an example of a technique for presenting content, according to an embodiment of the present invention;

FIG. 15B shows an example of a technique for presenting content, according to an embodiment of the present invention;

FIG. 15C shows an example of a technique for presenting content, according to an embodiment of the present invention;

DESCRIPTION

Figure 1:
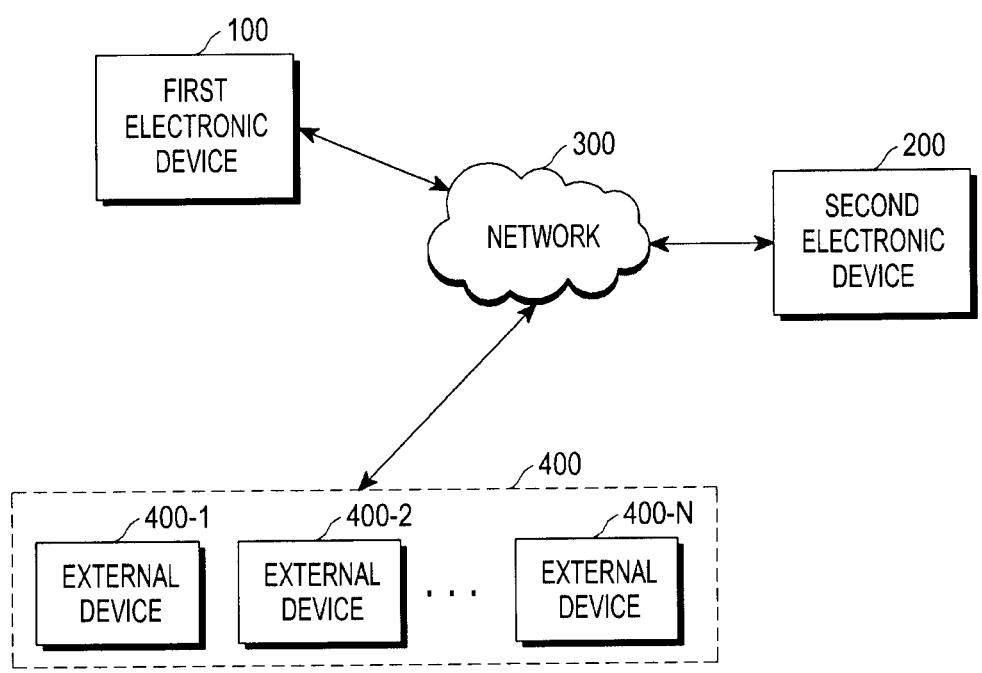
FIG. 1 shows an example of a content providing system according to an embodiment of the present invention.

Hereinafter, terms used in various embodiments of the present disclosure will be briefly described, and then the various embodiments of the present disclosure will be described in detail.

Although the terms used in the various embodiments of the present disclosure are selected as general terms widely used while considering the functions in the various embodiments, they may vary according to intentions of one of ordinary skill in the art, judicial precedents, the advent of new technologies, and the like. Terms arbitrarily selected by the applicant of the present disclosure may also be used in a specific case. In such instances, their meanings will be described in detail in the detailed description of the present disclosure. Hence, the terms must be defined based on the meanings of the terms and the contents of the entire specification, not by simply stating the terms themselves.

It will be understood that when the terms "includes," "comprises," "including," and/or "comprising," when used in this specification, specify the presence of stated elements and/or components, but do not preclude the presence or addition of one or more elements and/or components thereof. As used herein, the terms "part", "module", or the like refers to a unit that can perform at least one function or operation, and may be implemented as hardware, software, or a combination of hardware and software.

An electronic device according to the present disclosure may be a device with a communication function. For example, the electronic device may be at least one of a smartphone, a tablet Personal Computer (PC), a mobile phone, a video phone, an e-Book reader, a desktop PC, a laptop PC, a Netbook computer, a Personal Digital Assistant (PDA), a Portable Multimedia Player (PMP), a MP3 player, mobile medical equipment, a camera, or a wearable device (for example, a Head-Mounted-Device (HMD) such as electronic glasses, electronic clothes, electronic bracelet, electronic necklace, electronic Appcessory, or smart watch).

According to some embodiments, the electronic device may be a smart home appliance with a communication function. The smart home appliance, for example, the electronic device may be at least one of a Television (TV), a Digital Versatile Disk (DVD) player, audio equipment, a refrigerator, an air conditioner, a cleaner, an oven, a microwave, a washing machine, an air cleaner, a set-top box, a TV box (for example, Samsung HomeSync™, Apple TV™, or Google TV™), game consoles, electronic dictionary, a camcorder, or an electronic album.

According to some embodiments, the electronic device may be at least one of a navigation system and a vehicle infotainment apparatus.

According to some embodiments, the electronic device may be at least one of furniture or part of building/structure with a communication function, an electronic board, an electronic signature receiving device, or a projector. The electronic device may be one of the aforementioned devices or a combination of one or more of the aforementioned devices. However, it will be apparent to those of ordinary skill in the art that the electronic device according to the present disclosure is not limited to the aforementioned devices.

Hereinafter, various embodiments of the present disclosure will be described in detail with reference to the appended drawings. However, the present disclosure is not limited to the various embodiments. Like references given in the individual drawings represent components that perform the substantially same functions.

FIG. 1 shows a content providing system according to various embodiments of the present disclosure. Referring to FIG. 1, a content providing system may include a first electronic device 100, a second electronic device 200, a network 300, and an external device group 400.

The first electronic device 100 may be a user terminal. For example, the first electronic device 100 may be a portable terminal, such as a smartphone, a tablet PC, and the like. The first electronic device 100 may create and store content, such as a picture (for example, a Joint Photographic coding experts Group (JPG) file), a video (for example, a Moving Picture Experts Group (MPEG) file), music (for example, MPEG Audio Layer-3 (MP3) file), document (for example, a Portable Document Format (PDF) file), and an image (for example, a Portable Network Graphics (PNG) file or a Periscope Debugger Definition (PSD) file). For example, the first electronic device 100 may create and store a picture or a video through photographing by a camera, document written by a user through a document application, or an image drawn according to a user input (for example, a drawing input) through an image processing application. Also, in order to reproduce a process of creating content (for example, an image), the first electronic device 100 may create and store information (for example, information about drawing inputs) about a process of creating content. Also, the content may be a file (for example, Office Open XML file formats (OOXML)) that can be read or edited. Also, the first electronic device 100 may receive content, such as a picture, a video, music, document, an image, and the like, from the outside through the network 300, modify the received content, and then store the modified content. The content may be another format of digital content than a picture, a video, music, document, and an image. The first electronic device 100 may transmit original content or modified content to the second electronic device 200 through the network 300. The content transmitted from the first electronic device 100 may be shared with the external device group 400.

The second electronic device 200 may be a network device. The second electronic device 200, which is an electronic device of providing content, may be, for example, a server of providing a Social Network Service (SNS). The second electronic device 200 may receive content from the first electronic device 100 and each of external devices belonging to the external device group 400 through the network 300. The second electronic device 200 may detect whether the content received from the first electronic device 100 and each of the external devices belonging to the external device group 400 is original content created by an original author. If the second electronic device 200 detects that the received content is original content, the second electronic device 200 may insert identification information corresponding to the original author into the content. The identification information may be, for example, watermark information. The watermark information may include information about the original author of the content. The watermark information may be applied to content, such as a picture, a video, music, document, and an image. For example, the watermark may be a Robust watermark using a method of resizing, cropping, or transcoding a media object, a Fragile watermark capable of detecting, when a part of a media object is modified, the modified part, or the like.

According to an embodiment, the second electronic device 200 may detect whether the content received from the first electronic device 100 and each of the external devices belonging to the external device group 400 is original content created by the original author. For example, the second electronic device 200 may identify the original author based on identification information (for example, a watermark) included in the received content, and if the second electronic device 200 detects that a sender of the content is different from the original author, the second electronic device 200 may detect that the received content is modified content. Or, if the second electronic device 200 detects that no identification information (for example, a watermark) is included in the received content, the second electronic device 200 may detect that the sender of the content is the original author of the received content. In such instances, the second electronic device 200 may insert identification information corresponding the original author into the received content.

According to an embodiment, if the second electronic device 200 detects that the received content is not the original content, the second electronic device 200 may transmit a notification message to the original author. For example, the second electronic device 200 may transmit a message notifying that modified content that is produced as a result of modifying the original content was received by the second electronic device 200, to the original author. Herein, the message may be transmitted using the original author's contact information (for example, an identifier (ID), a phone number, or an E-mail address). The original author's contact information may be included in the identification information (for example, a watermark) of the original author. According to an embodiment, the original author may transmit a request for deleting (or disconnecting) the modified content to the second electronic device 200. If the second electronic device 200 receives a request for deleting (or disconnecting) the modified content, the second electronic device 200 may delete the modified content, or stop providing the modified content to other users. Additionally or alternatively, if a deletion request is received from the original author, the second electronic device 200 may inform the sender of the modified content that a deletion request was received, or may provide the modified content again when the deletion (disconnection) request from the original author is withdrawn.

According to an embodiment, the second electronic device 200 may check the identification information (for example, a watermark) of the original author included in the received content, and again insert the identification information of the original author included in the content into the content if the received content is not original content. Since a watermark may be damaged when original content is repeatedly modified, original author identification information verifying original content may be again inserted into the modified content in order to maintain the watermark without being damaged.

According to an embodiment, the second electronic device 200 may identify an original author and a secondary author of the received content, and create author information including the original author and the secondary author of the received content. Also, the second electronic device 200 may create a content group which is a group of content based on original content, according to original author information detected from the received content, for example, identification information (for example, a watermark) corresponding to the original author. For example, if content a is received from a user a, content b is received from a user b, and the content b is content generated by modifying the content a, the second electronic device 200 may include the content a and the content b in the same content group. Also, the second electronic device 200 may create content group information which is information about the content group. For example, the second electronic device 200 may create content group information that includes content-in-group information including at least one content according to a modification performed on the original content to produce current content, and a content tree according to a content attribute. For example, the content attribute may be at least one of a time at which content is modified, an amount by which content is modified, a content rating, content views, a relationship between an original author and a secondary author of content, and a file size of content.

According to an embodiment, the second electronic device 200 may create additional information including at least one of the author information and the content group information. The second electronic device 200 may provide the received content and the additional information of the received content to the first electronic device 100 and each or a part of the external devices belonging to the external device group 400 to share the received content and the additional information.

The network 300 may be at least one of a short-range communication network or a mobile communication network. The network 300 may enable the first electronic device 100, the second electronic device 200, and the external device group 400 to communicate with each other.

The external device group 400 may include at least one external device 400-1 to 400-N. The at least one external device 400-1 to 400-N may be one of an electronic device, such as a smartphone, a tablet PC, a PC, and a TV, and an electronic device such as a wearable device.

Figure 2:
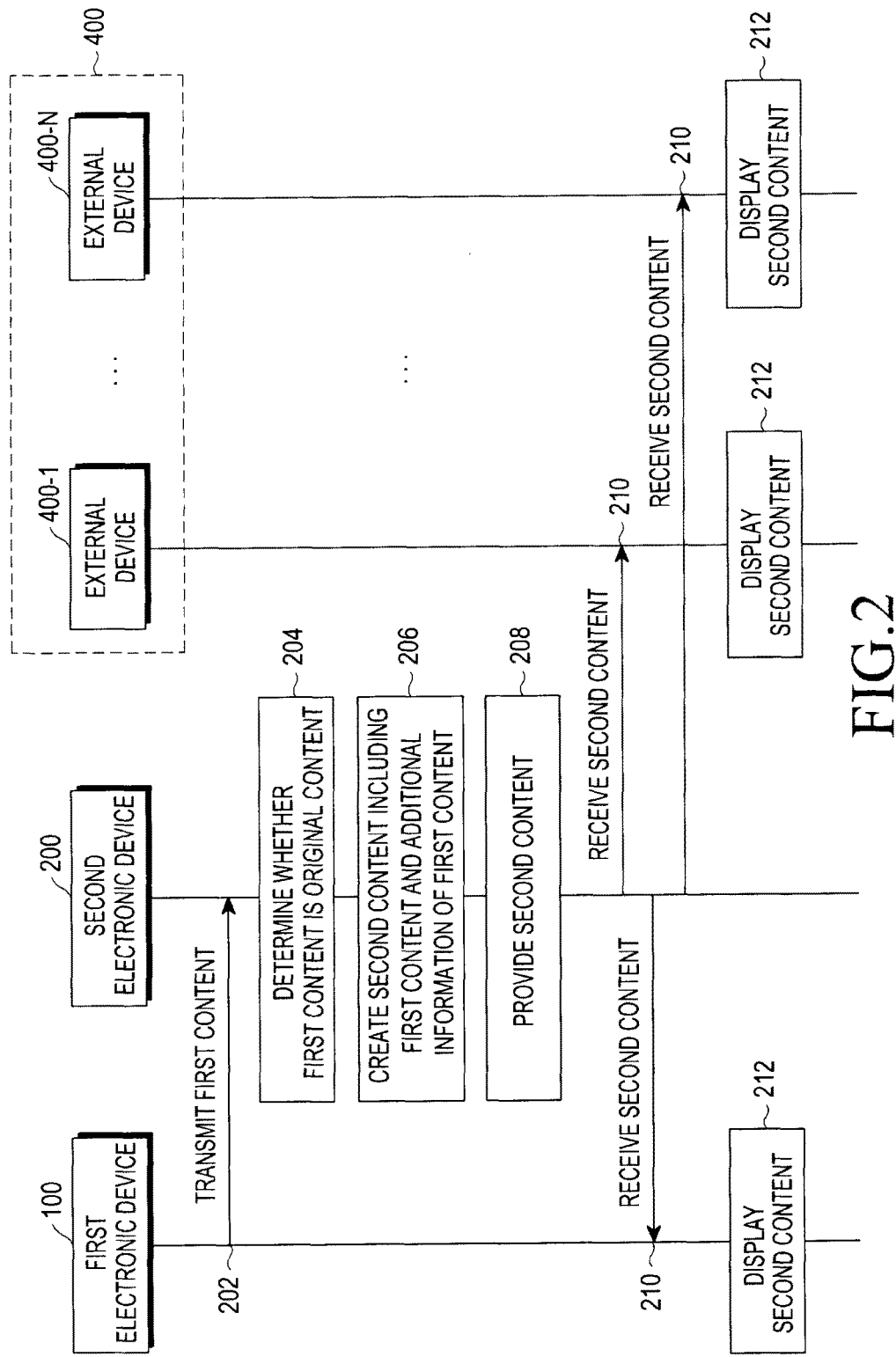
FIG. 2 is a flowchart illustrating an example of a content providing method according to an embodiment of the present invention.

FIG. 2 is a flowchart illustrating a content providing method according to an embodiment of the present disclosure. Referring to FIG. 2, the first electronic device 100 may transmit first content to the second electronic device 200 through the network 300, in operation 202. For example, the first electronic device 100 may transmit content, such as a picture, a video, music, document, or an image, whose original author is a user, or may transmit modified content, such as a picture, a video, music, document, or an image that is produced by modifying content received from the outside.

If the second electronic device 200 receives the first content from the first electronic device 100, the second electronic device 200 may detect whether the first content is original content, in operation 204. For example, the second electronic device 200 may detect whether the first content is original content written by the original author or content modified by a secondary author. The modification may include changing, altering, adding or deleting the entire or a part of content.

The second electronic device 200 may create second content including the first content and additional information of the first content, according to the result of the determination of whether or not the first content is original content, in operation 206. For example, if the second electronic device 200 detects that the first content is content written by an original author, the second electronic device 200 may insert identification information corresponding to the original author into the first content, and create author information including information about the original author. The identification information may be, for example, watermark information. The watermark information may include information about the original author of the content.

If the second electronic device 200 detects that the received first content is not original content, the second electronic device 200 may transmit a notification message to the original author of the first content. For example, the second electronic device 200 may transmit a message notifying that modified content modified from original content was received by the second electronic device 200, to the original author of the first content. At this time, the message may be transmitted using the original author's contact information (for example, an ID, a phone number, or an E-mail address). The original author's contact information may be included in the original author's identification information (for example, a watermark). Accordingly, the original author may transmit a request for deleting (or disconnecting) the modified content to the second electronic device 200. If the second electronic device 200 receives the request for deleting (or disconnecting) the modified content, the second electronic device 200 may delete the modified content, or stop providing the modified content to other users. Additionally or alternatively, if a deletion request is received from the original author, the second electronic device 200 may inform a sender of the modified content that a deletion request was received, or may provide the modified content again when the deletion (or disconnection) request from the original author is withdrawn.

According to an embodiment, if the second electronic device 200 detects that the first content is not original content, the second electronic device 200 may identify an original author and a secondary author of the received content, and create author information including an original author and a secondary author of the received content. Also, if the second electronic device 200 detects that the received first content is modified content, the second electronic device 200 may create content group information associated with at least one modified content according to a modification associated with the modified content. For example, if the received first content is content resulting from modifying original content a to produce content b, and then modifying the content b to produce content c, the content group information of the first content may include content-in-group information corresponding to the content a, the content b, and the content c, and a content tree representing a relationship between the content a, the content b, and the content c.

The second electronic device 200 may create additional information including at least one of the author information and the content group information. The second electronic device 200 may create second content including the first content and the additional information of the first content.

Then, the second electronic device 200 may provide the second content including the first content and the additional information of the first content to the first electronic device 100 and each or a part of the external devices 400-1 to 400-N belonging to the external device group 400 to share the second content, in operation 208.

According to an embodiment, the first electronic device 100 and each of the external devices 400-1 to 400-N belonging to the external device group 400 may receive the second content, in operation 210. Then, the first electronic device 100 and each of the external devices 400-1 to 400-N belonging to the external device group 400 may display the received second content through a display (for example, a touch screen). For example, the first electronic device 100 and each of the external devices 400-1 to 400-N belonging to the external device group 400 may display the second content (for example, the first content and the additional information of the first content). If the additional information includes the author information, the first electronic device 100 and each of the external devices 400-1 to 400-N belonging to the external device group 400 may display the first content and the author information (for example, information about an original author and information about a secondary author) of the first content. If the additional information includes the author information and the content group information, the first electronic device 100 and each of the external devices 400-1 to 400-N belonging to the external device group 400 may display the first content, information about the original author of the first content, information about the secondary author of the first content, and content group information associated with at least one content with regard to a modification that is performed on the original content to produce the current modified content.

Hereinafter, configurations and operations of the first electronic device 100 and the second electronic device 200 according to an embodiment of the present disclosure will be described as an example.

Figure 3:
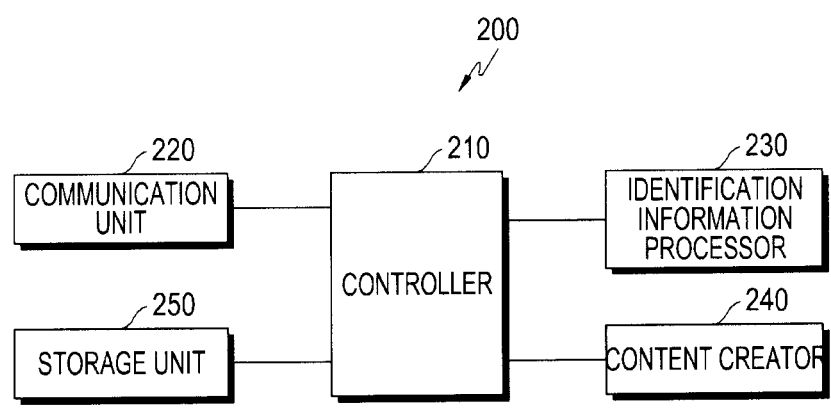
FIG. 3 is a block diagram of an example of a second electronic device according to an embodiment of the present invention.

First, a configuration of the second electronic device 200 according to an embodiment of the present disclosure will be described. FIG. 3 is a block diagram of the second electronic device 200 according to an embodiment of the present disclosure. Referring to FIG. 3, the second electronic device 200 may include a controller 210, a communication unit 220, an identification information processor 230, a content creator 240, and a storage unit 250.

The controller 210 may control the communication unit 220, the identification information processor 230, the content creator 240, and the storage unit 250. For example, the controller 210 may control the overall functions of the second electronic device 200, and also control signal flow between the individual components.

For example, if first content is original content written by an original author, the controller 210 may control the identification information processor 230 to insert identification information corresponding to the original author into the first content. Also, if first content is not original content, the controller 210 may transmit a notification message to an original author of the first content. If the controller 210 receives a request for deleting (or disconnecting) modified content, the controller 210 may delete the modified content or for stopping providing the modified content to other users. Additionally or alternatively, if a deletion request is received from the original author, the controller 210 may inform the sender of the modified content that a deletion request was received, or may provide the modified content again when the deletion (disconnection) request from the original author is withdrawn.

The communication unit 220 may connect the second electronic device 200 to the first electronic device 100 or the external device group 400. The communication unit 220 may connect to the first electronic device 100 through short-range communication, mobile communication, or another communication, and receive the first content from the first electronic device 100.

The identification information processor 230 may detect whether identification information exists in the first content to detect whether the first content is original content written by an original author or content modified by a secondary author, under the control of the controller 210. If it is detected that the first content is original content written by an original author, the identification information processor 230 may insert identification information corresponding to the original author into the first content, under the control of the controller 210. The identification information may be, for example, watermark information. The watermark information may include information about the original author of the content.

The content creator 240 may create second content including the first content and additional information of the first content. According to an embodiment of the present disclosure, the additional information of the first content may include at least one of author information and content group information. At least one of the identification information processor 230 and the content creator 240 may be included in the controller 210.

Figure 4:
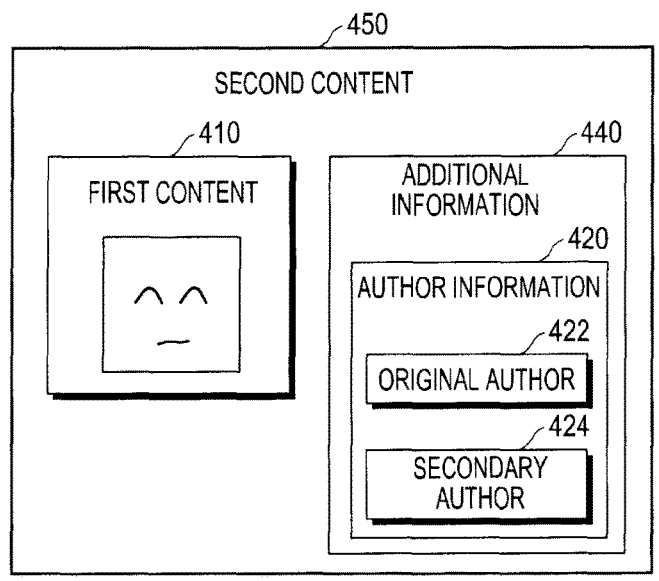
FIG. 4 shows an example of a second content, according to an embodiment of the present invention.
Figure 5:
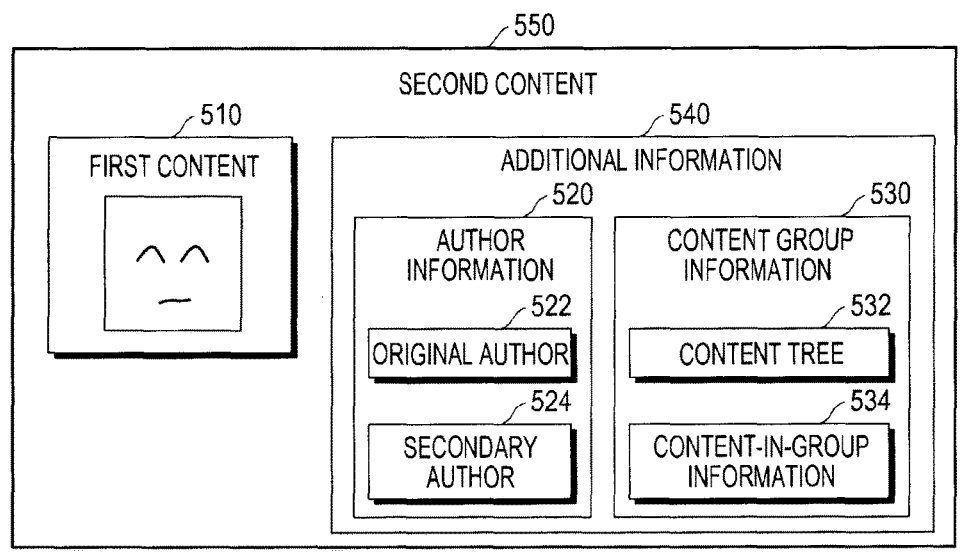
FIG. 5 shows an example of a second content, according to an embodiment of the present invention.

FIGS. 4 and 5 show second content according to various embodiments of the present disclosure.

First, referring to FIG. 4, second content 450 may include first content 410 and additional information 440 of the first content 410. The additional information 440 may include author information, and the author information 420 may include at least one of information about an original author of the first content 410 or information about a secondary author of the first content 410. For example, the content creator 240 may identify an original author and a secondary author of the received first content 410, and create author information 420 including information 422 about the original author of the received first content 410 and information 424 about the secondary author of the received first content 410. The content creator 240 may create the additional information 440 including the author information 420 of the first content 410, and create the second content information 450 using the first content 410 and the additional information 440 including the author information 420 of the first content 410.

According to another embodiment, referring to FIG. 5, second content 550 may include first content 510 and additional information 540 of the first content 510. The additional information 540 may include author information 520 and content group information 530. For example, the content creator 240 may identify an original author and a secondary author of the received first content 510, and create author information 520 including information 522 about an original author of the received first content 510 and information 524 about a secondary author of the received first content 510. Also, the content creator 240 may create content group information 530 if the received first content 510 is modified content. The content group information 530 may include content-in-group information 534 including at least one content (for example, original content and modified content) with regard to a modification that is performed on the original content to produce the current modified content. Also, the content group information 530 may further include a content tree 532 in which the at least one content is stratified to have a correlation branched from an upper level to a lower level with regard to a modification performed on original content, according to a content attribute. For example, the content attribute may be at least one of a time at which content is modified, an amount by which content is modified, a content rating, content views, a relationship between an original author and a secondary author of content, and a file size of content.

For example, if the content attribute is a time at which content is modified, the content tree 532 may include information about a hierarchical structure of at least one content according to a time at which the content is modified (or created). For example, content modified a longer time ago may be included in the upper level on the hierarchical structure.

Or, if the content attribute is an amount by which content is modified, the content tree 532 may include information about a hierarchical structure of at least one content according to the amounts of the modified parts of the content. For example, content having a larger modified part may be included in the upper level on the hierarchical structure.

Or, if the content attribute is a content rating, the content tree 532 may include information about a hierarchical structure of at least one content according to a rating level for the content. For example, content having a higher rating level may be included in the upper level on the hierarchical structure.

Or, if the content attribute is content views, the content tree 532 may include information about a hierarchical structure of at least one content according to content views. For example, content having more content views may be included in the upper level on the hierarchical structure.

Or, if the content attribute is a relationship between an original author and a secondary author of content, the content tree 532 may include information about a hierarchical structure of at least one content according to a degree of a relationship between an original author and a secondary author of the content. For example, content having a higher degree of a relationship between an original author and a secondary author of the content may be included in the upper level on the hierarchical structure.

Or, if the content attribute is a file size of content, the content tree 532 may include information about a hierarchical structure of at least one content according to a file size of the content. For example, content having a greater file size may be included in the upper level on the hierarchical structure.

However, the content attribute may be any other attribute as long as it can decide a level of at least one content included in the content-in-group information. Also, the content attribute may be a combination of two or more of the above-described content attributes.

The content creator 240 may create additional information 540 including the author information 520 of the first content 510 and the content group information 530, and create second content 550 using the first content 510 and the additional information 540 including the author information 520 of the first content 510 and the content group information 530.

As described above, the first content, and the second content including the additional information of the first content, created by the second electronic device 200 (for example, the content creator 240) may be provided to other devices, such as the first electronic device 100 and the external devices 400-1 to 400-N, through the communication unit 210.

Figure 6:
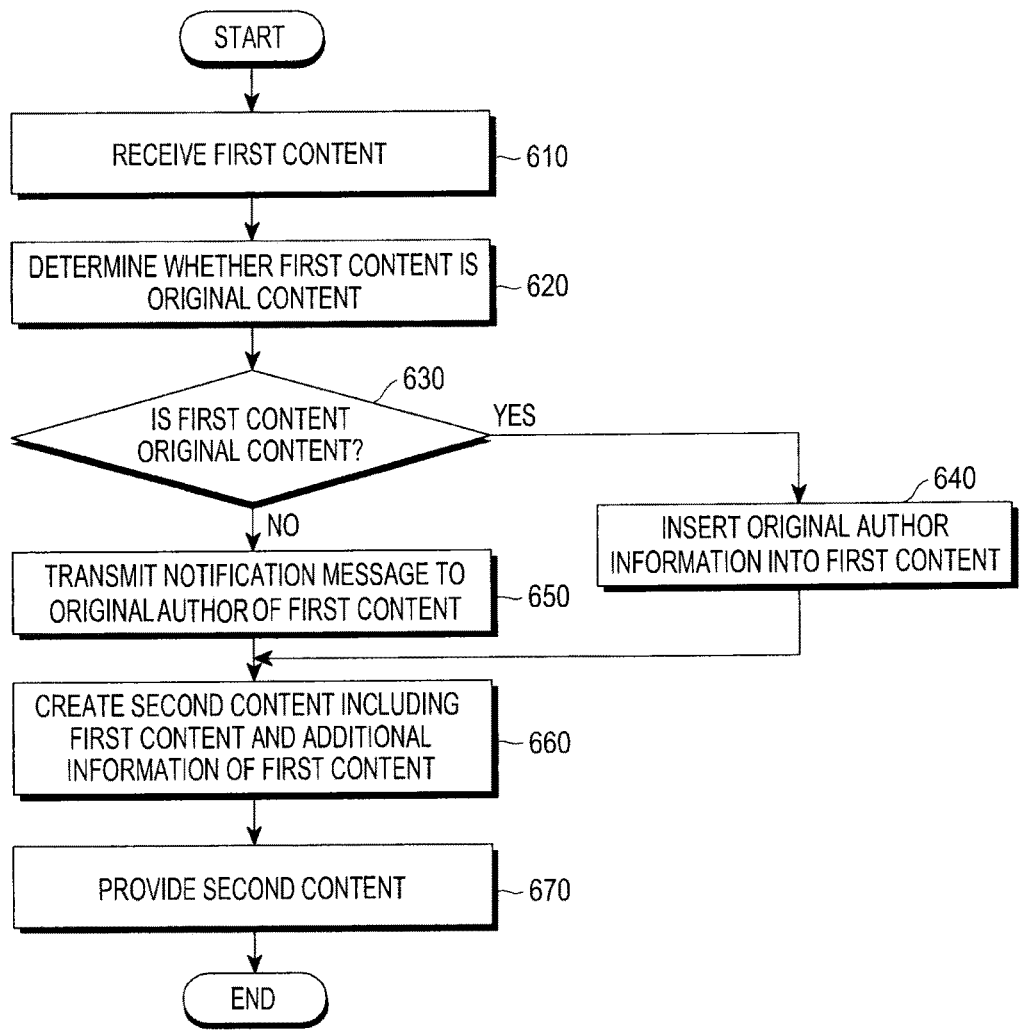
FIG. 6 is a flowchart illustrating an example of an operation method of a second electronic device according to an embodiment of the present invention.

Hereinafter, operations of the second electronic device 200 according to various embodiments of the present disclosure will be described as an example. FIG. 6 is a flowchart illustrating an operation method of the second electronic device 200 according to an embodiment of the present disclosure. Referring to FIG. 6, the second electronic device 200 may receive first content, in operation 610. For example, the second electronic device 200 may receive first content from the first electronic device 100 and each of the external devices belonging to the external device group 400, through the network 300.

Then, the second electronic device 200 may detect whether the first content is original content created by an original author, in operation 620. For example, if the second electronic device 200 detects that information of an author who sent the first content is identical to original author information (for example, a watermark) included in the first content, the second electronic device 200 may detect that the first content is original content. Or, when the second electronic device 200 detects that the first content includes no original author information (for example, a watermark), the second electronic device 210 may detect that the first content is original content. If the second electronic device 200 detects that the received first content is original content, the second electronic device 200 may insert original author information into the first content, in operation 640. The original author information may be identification information corresponding to the original author. The identification information may be, for example, watermark information. If the second electronic device 210 detects that the received first content is not original content, the second electronic device 200 may transmit a notification message to the original author of the first content, in operation 650. For example, the second electronic device 200 may transmit a message notifying that modified content modified from the original content was received by the second electronic device 200, to the original author of the first content. For example, the message may be transmitted using the original author's contact information (for example, a SNS ID, a phone number, or an E-mail address). The original author's contact information may be included in the identification information (for example, a watermark) of the original author.

Then, the second electronic device 200 may create second content including the first content and additional information of the first content, in operation 660. For example, if the second electronic device 200 detects that the first content is original content, the second electronic device 200 may create additional information of the first content including original author information of the first content, and create second content including the first content and the additional information of the first content. If the second electronic device 200 detects that the first content is modified content, the second electronic device 200 may create additional information of the first content including at least one of author information including original author information and secondary author information and content group information, and create second content including the first content and the additional information of the first content. For example, the second electronic device 200 may create the second content according to at least one of the embodiments described above with reference to FIGS. 4 and 5.

The second electronic device 200 may provide the created second content, in operation 670. Accordingly, the first electronic device 100 may receive the second content from the second electronic device 200, and display the received second content.

Figure 7:
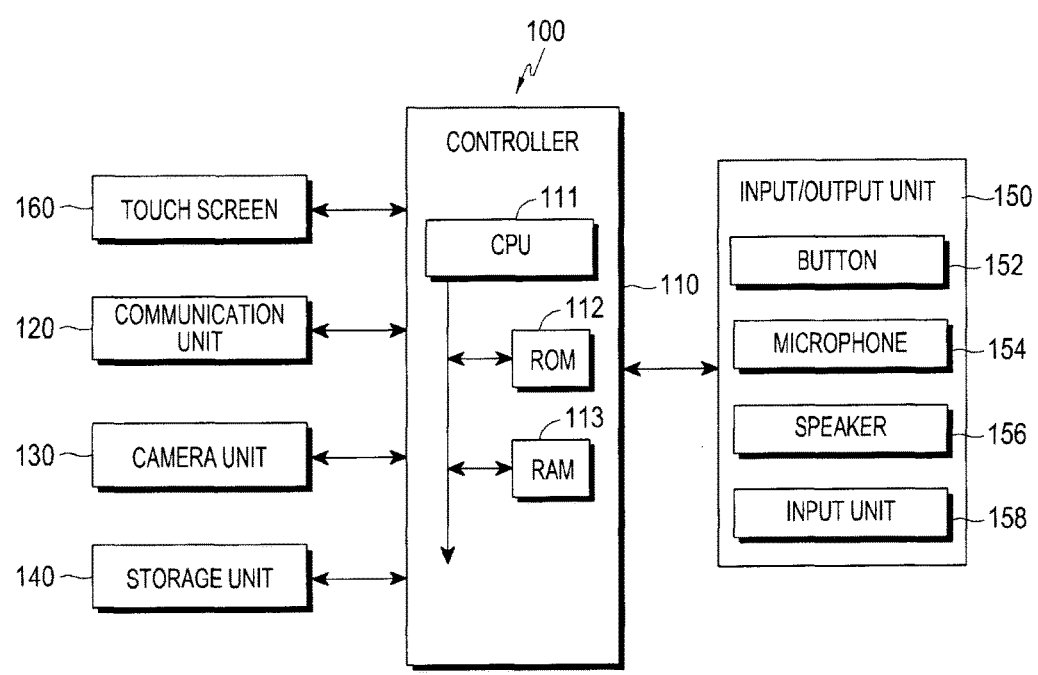
FIG. 7 is a block diagram of an example of a first electronic device according to an embodiment of the present invention.

FIG. 7 is a block diagram of the first electronic device 100 according to an embodiment of the present disclosure. Referring to FIG. 7, the first electronic device 100 may include a controller 110, a communication unit 120, a camera unit 130, a storage unit 140, an input/output unit 150, and a touch screen 160.

The controller 110 may include a Central Processor Unit (CPU) 111, a Read Only Memory (ROM) 112, and a Random Access Memory (RAN) 113. Or, the controller 110 may include a Digital Signal Processor (DSP). The ROM 112 may store a control program for controlling the first electronic device 100. The RAM 113 may store signals or data received from the outside of the first electronic device 100, or may be used as a memory area for tasks being performed by the first electronic device 100. The CPU 111 may include a single core, a dual core, a triple core, or a quad core. The CPU 111, ROM 112, and RAM 113 may be connected to each other through internal buses.

Also, the controller 110 may control the communication unit 120, the camera unit 130, the storage unit 140, the touch screen 160, and the input/output unit 150. For example, the controller 110 may control overall operations of the first electronic device 100, and also control signal flow between the individual components.

For example, according to various embodiments, the controller 110 may write (create) or store content, such as a picture, a video, music, document, and an image, based on a user input, or may receive and store content written (created) by another user from an external device. Also, the controller 110 may write (create) and store content obtained by manipulating already created or stored content based on a user input.

The communication unit 120 may connect the first electronic device 100 to an external device (for example, the second electronic device 200). The external device may include a mobile phone (not shown), a smartphone (not shown), a tablet PC (not shown), and a server (not shown). Also, the communication unit 120 may connect the first electronic device 100 to an external device through mobile communication using at least one (for example, one or multiple) antenna (not shown), under the control of the controller 110. The communication unit 120 may transmit/receive radio signals for a voice call, a video call, a SMS message, or a MMS message to/from a mobile phone (not shown), a smartphone (not shown), a tablet PC (not shown), or another electronic device (not shown) when the corresponding phone number is input to the first electronic device 100. The communication unit 120 may further include at least one of a Wireless Local Area Network (WLAN) module (not shown) and a short-range communication module (not shown). The WLAN module may be connected to the Internet at a place in which a Wireless Access Point (WAP) has been installed, under the control of the controller 110. The WLAN module may support the IEEE802.11x standard. The short-range communication module may perform short-range communication between the first electronic device 100 and an image forming apparatus in a wireless fashion, under the control of the controller 110. The short-range communication may include Bluetooth, Infrared Data Association (IrDA), and the like. The communication unit 120 may transmit content, such as a picture, a video, music, document, or an image, whose original author is a user, to the second electronic device 200, or may transmit modified content, such as a picture, a video, music, document, or an image, modified from content received from the outside, to the second electronic device 200, under the control of the controller 110.

The camera unit 130 may include at least one camera for photographing a picture or a video, under the control of the controller 110. Also, the camera unit 130 may transmit the photographed picture or the photographed video to the controller 110. The picture or the video photographed by the camera unit 130 may be included in content.

The storage unit 140 may store signals or data that are input/output in correspondence to operations of the communication unit 120, the camera unit 130, the storage unit 140, the input/output unit 150, and the touch screen 160, under the control of the controller 110. The storage unit 140 may store a plurality of programs and a plurality of applications for controlling the first electronic device 100 or the controller 110, and programs and data for executing various functions. Also, according to various embodiments, the storage unit 140 may store content, such as a picture, a video, music, document, and an image, written (created) based on a user input, may store content written (created) by another user, or may store content modified based on a user input.

The term "storage unit" indicates the ROM 112 and RAM 113 in the controller 110, or a memory card (not shown) (for example, a Secure Digital (SD) card or a memory stick) installed in the first electronic device 100. The storage unit 140 may include a non-volatile memory, a volatile memory, a hard disk drive (HDD), and a solid state drive (SSD).

Also, the storage unit 140 is machine (for example, a computer)-readable media, and the term "machine-readable media" can be defined as media (or apparatus) of providing data to a machine so that the machine can perform a specific function. The machine-readable media may be storage media. The storage unit 140 may include a non-volatile memory and a volatile memory. The media may include non-volatile media and volatile media. The media should be a tangible device so that commands transferred by the media can be detected by a physical device for reading the commands through a machine. The machine-readable media may include at least one among a floppy disk, a flexible disk, a hard disk, a magnetic tape, a compact disc read-only memory (CD-ROM), an optical disk, a punch card, a paper tape, a RAM, a Programmable Read-Only Memory (PROM), an Erasable PROM (EPROM), and a FLASH-EPROM, however, the machine-readable media is not limited to the above-mentioned devices.

The input/output unit 150 may include a button 152, a microphone 154, a speaker 156, and an input unit 158. However, the input/output unit 150 is not limited to the above-mentioned devices, and a cursor control, such as a mouse, a trackball, a joystick, or cursor direction keys, may be provided to communicate with the controller 110 and control the movement of a cursor on the touch screen 160.

The microphone 154 may receive a voice or sound to generate an electrical signal, under the control of the controller 110.

The speaker 156 may output sound corresponding to various signals (for example, a radio signal, a broadcasting signal, a digital audio file, a digital video file, etc.) according to execution of the communication unit 120 or an application, out of the electronic device 100, under the control of the controller 110.

The input unit 158 may be a device or object that is inserted into and kept in the first electronic device 100 or separated from the first electronic device 100. When the input unit 158 is inserted into and kept in the first electronic device 100, the input unit 158 may be drawn out of or decoupled from the first electronic device 100. The input unit 158 may be a user's finger or input means such as a stylus pen (hereinafter, simply referred to as a "pen") capable of making an input by approaching or touching the touch screen 160. The input unit 158 may be used to modify the content.

The touch screen 160 may provide a Graphic User Interface (GUI) for enabling a user to write (create), modify, use, and transmit various content. For example, the touch screen 160 may provide a user input for writing (creating), manipulating, using, and transmitting content, using various gesture inputs, such as at least one approach/touch input, through a user's body part (for example, a finger including a thumb) or the input unit (for example, a pen) 158 capable of making a touch input. The touch screen 160 may be a resistive type, a capacitive type, an infrared type, or an acoustic wave type. According to some examples, the touch screen 160 may include a recognition sheet for recognizing an electromagnetic (EM) type device (for example, a pen).

Figure 8:
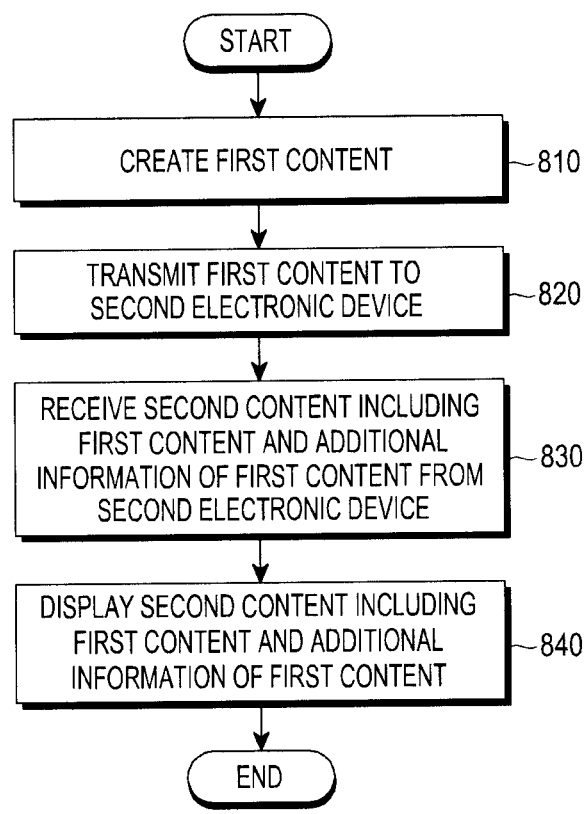
FIG. 8 is a flowchart illustrating an example of an operation method of a first electronic device according to an embodiment of the present invention.

FIG. 8 is a flowchart illustrating an operation method of the first electronic device 100 according to an embodiment of the present disclosure. Referring to FIG. 8, the first electronic device 100 may create first content, in operation 810. For example, the first content may include one or more of a picture or a video photographed by the camera unit 130, a document written by a user through a document application, or an image drawn according to a user input (for example, a drawing input) through an image processing application. Also, the first electronic device 100 may create first content corresponding to a picture, a video, music, document, or an image modified based on a picture, a video, music, document, or an image received from the outside. The content may include another format of digital content than a picture, a video, music, document, and an image. According to embodiments, the first content may be created by various methods. A method of creating the first content will be described with reference to FIGS. 9 and 10, later.

The first electronic device 100 may transmit the first content to the second electronic device 200 through the network 300, in operation 820. According to some examples, the first electronic device 100 may transmit the first content, together with information (for example, a title, a text, a tag, or a play file related to the content) about the first content, to the second electronic device 200.

The first electronic device 100 may receive second content including the first content and additional information (for example, the additional information 440) of the first content from the second electronic device 200, in operation 830. For example, if the first content is original content written by an original author, the additional information may include information (for example, the original author information 422) about an original author of the first content, for example, identification information corresponding to the original author According to another embodiment, if the first content is modified content, the additional information may include author information (for example, the author information 420) including information (for example, the original author information 422) about an original author of the first content and information (for example, the secondary author information 424) about a secondary author of the first content. According to still another embodiment, if the first content is modified content, the additional information (for example, the additional information 540) may include author information (for example, the author information 520) including information (for example, the original author information 522) about an original author of the first content and information (for example, the secondary author information 524) about a secondary author of the first content, and content group information (for example, the content group information 530) about at least one content with regard to a modification performed on the original content to produce the current modified content. Also, the content group information may further include a content tree in which the at least one content is into a hierarchical structure having a correlation branched from an upper level to a lower level with regard to a modification performed on the original content to the current modified content according to a content attribute. For example, the content attribute may be at least one of a time at which content is modified, an amount by which content is modified, a content rating, content views, a relationship between an original author and a secondary author of content, and a file size of content.

The first electronic device 100 may display the second content including the first content and the additional information of the first content on the touch screen 160, in operation 840. For example, the first electronic device 100 may display the first content in a first area, and the author information in a second area, using the first content and the additional information of the first content.

Figure 9A:
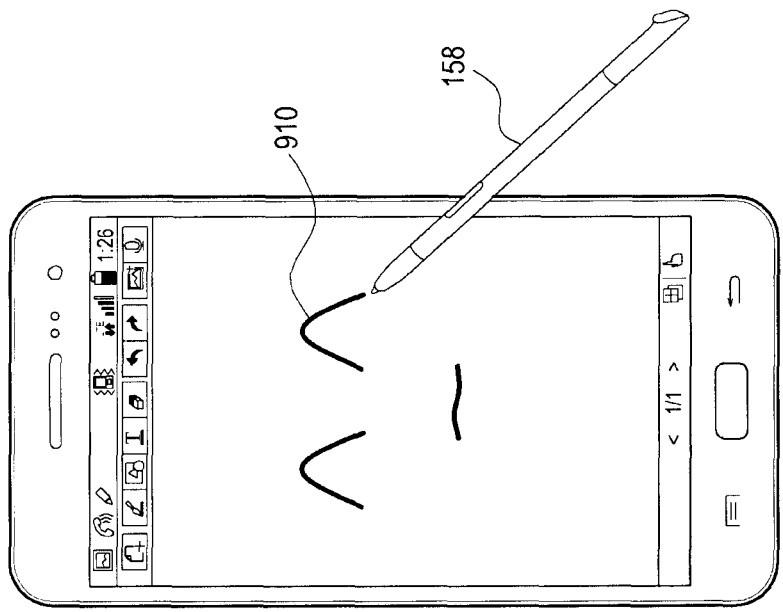
FIG. 9A shows an example of content, according to an embodiment of the present invention.
Figure 9B:
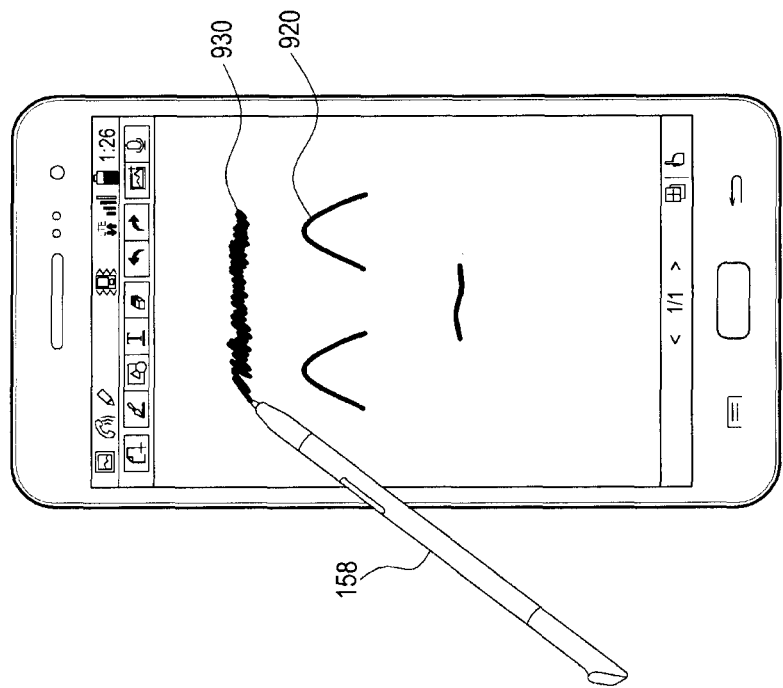
FIG. 9B shows an example of content, according to an embodiment of the present invention.

According to an embodiment, a method of creating the first content in the first electronic device 100 will be described as an example. FIGS. 9A-B shows an example in which content according to an embodiment of the present disclosure is an image drawn by a drawing input. Referring to FIG. 9A, the first electronic device 100 may create first content corresponding to an image 910 drawn according to a drawing input by a user using the input unit 158. According to another embodiment, referring to FIG. 9B, if modification (for example, an additional drawing input) by a user using the input unit 158 is made on an image 920 received from the outside, the first electronic device 100 may create first content corresponding to a modified image including the received image 920 and an image 930 drawn by the additional drawing input.

Figure 10:
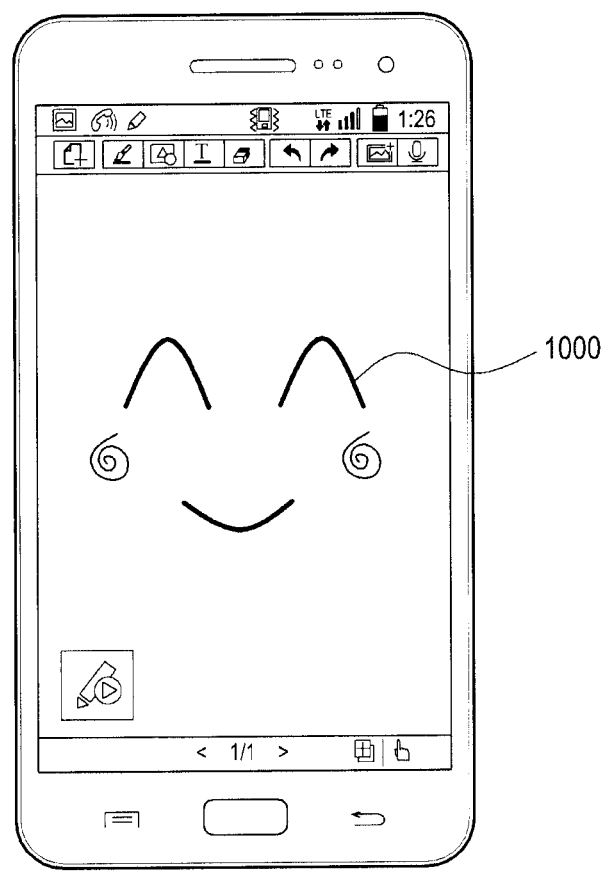
FIG. 10 shows an example in which content according to an embodiment of the present invention is a moving picture.

FIG. 10 shows an example in which content according to an embodiment of the present disclosure is a video. Referring to FIG. 10, the first electronic device 100 may create first content corresponding to a video 1000 drawn according to a drawing input by a user using the input unit 158.

Figure 11:
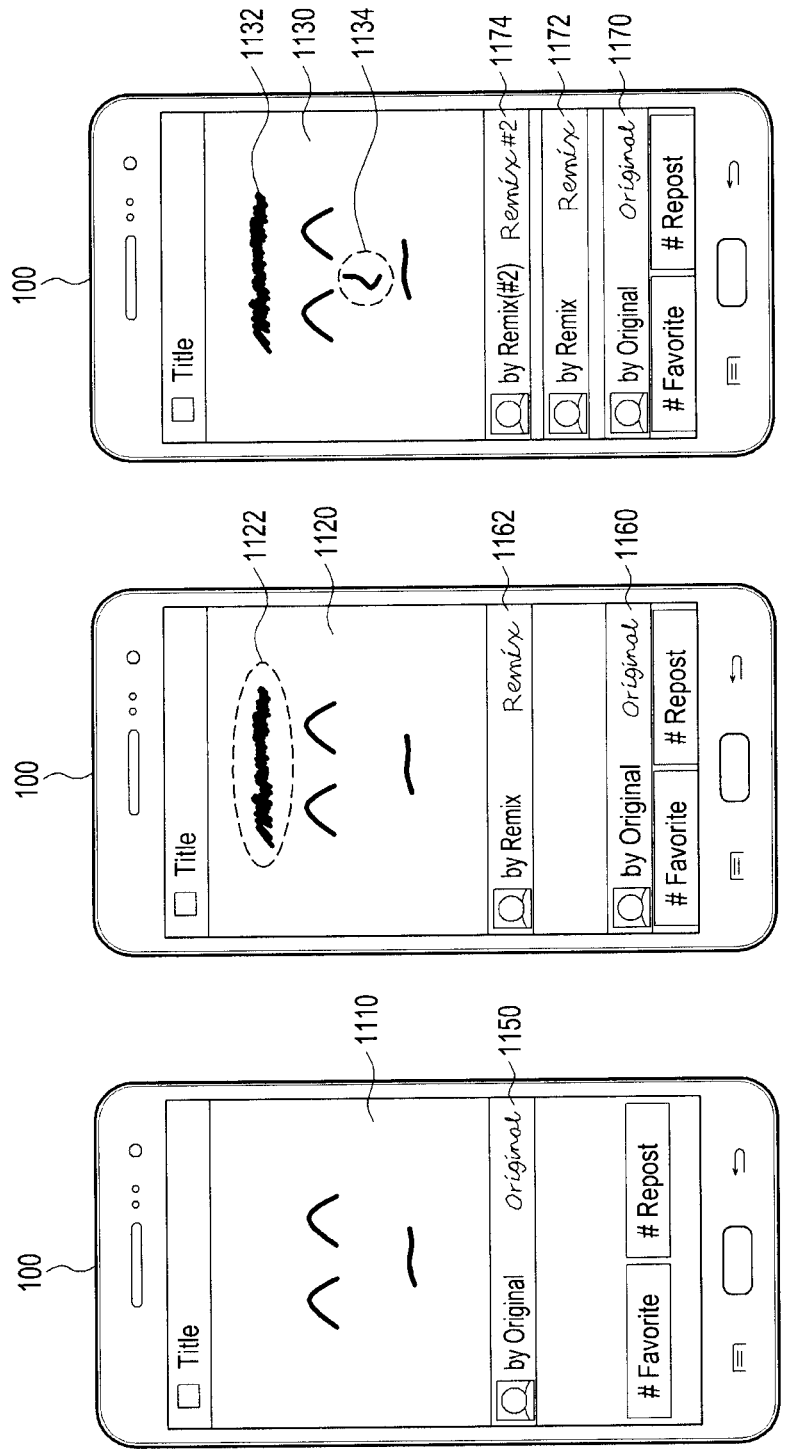
FIG. 11A shows an example of a technique for presenting content, according to an embodiment of the present invention.
FIG. 11B shows an example of a technique for presenting content, according to an embodiment of the present invention.
FIG. 11C shows an example of a technique for presenting content, according to an embodiment of the present invention.

According to an embodiment, a method of displaying second content including first content and additional information of the first content in the first electronic device 100 will be described as an example. FIGS. 11A-C shows an example in which content is displayed in a first area, and author information is displayed in a second area, according to various embodiments of the present disclosure.

Referring to FIGS. 11A-C, as shown in FIG. 11A, if first content 1110 is original content created by an original author, the first electronic device 100 may display the first content 1110 in a first area, and display author information 1150 in a second area. According to another embodiment, as shown in FIG. 11B, if first content 1120 is modified content including a first modified part 1122 modified by a first secondary author, the first electronic device 100 may display the first content 1120 including the first modified part 1122 in a first area, and display original author information 1160 and first secondary author information 1162 about the first secondary author in a second area. According to still another embodiment, as shown in FIG. 11C, if first content 1130 includes a first modified part 1132 modified by a first secondary author and a second modified part 1134 modified by a second secondary author, the first electronic device 100 may display the first content 1130 including the first modified part 1132 and the second modified part 1134 in a first area, and display original author information 1170, first secondary author information 1172, and second secondary author information 1174 in a second area. Alternatively, the first electronic device 100 may display at least one of the first secondary author information 1172 and the second secondary author information 1174, in the second area. In the current embodiment, an example in which first content is modified two times by two secondary authors is shown, however, the first content may be modified more times by more secondary authors, and in such instances, the first electronic device 100 may display information about the individual secondary authors and the entire or a part of modified parts in the second area. Accordingly, the user can know information about an original author and a secondary author of the first content. According to some embodiments, the first area and the second area may be provided on the same electronic page or on separate electronic pages, and the first area may include at least one part of the second area.

FIGS. 12 to 15C show examples in which content is displayed using additional information of the content, according to various embodiments of the present disclosure.

Figure 12:
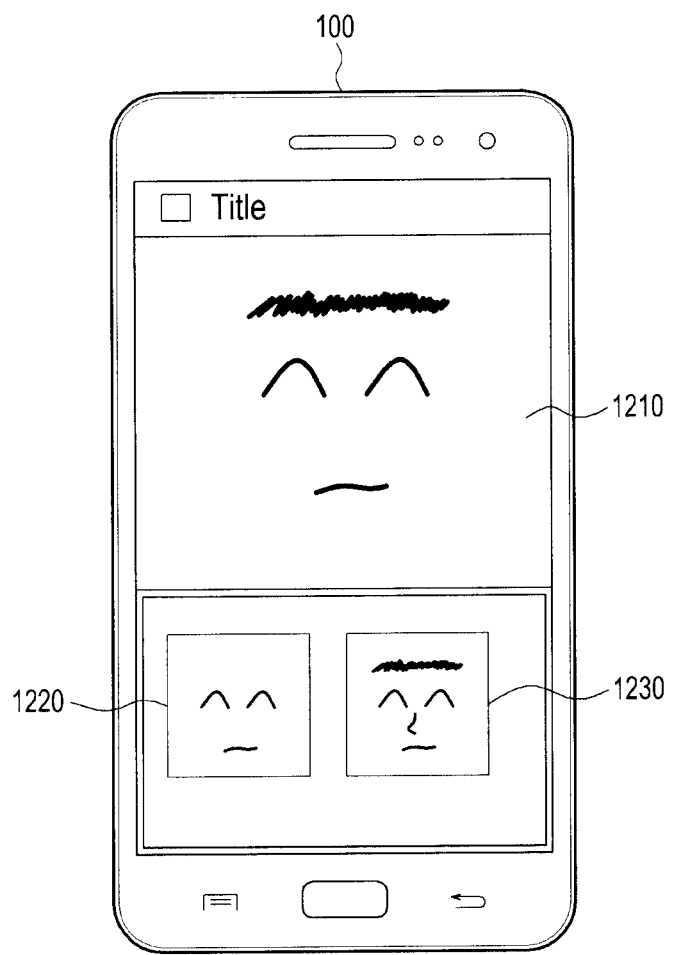
FIG. 12 shows an example of a technique for presenting content, according to an embodiment of the present invention.

Referring to FIG. 12, the first electronic device 100 may display first content in a first area, and display content based on content group information in a third area, using the first content and additional information of the first content. According to an embodiment, the first electronic device 100 may display first content 1210 in a first area, and display at least one content 1220 and 1230 included in content-in-group information in a third area, based on content group information included in additional information of the first content 1210. The first area and the third area may be provided on the same electronic page or on separate electronic pages, and the first area may include at least one part of the third area.

Figure 13:
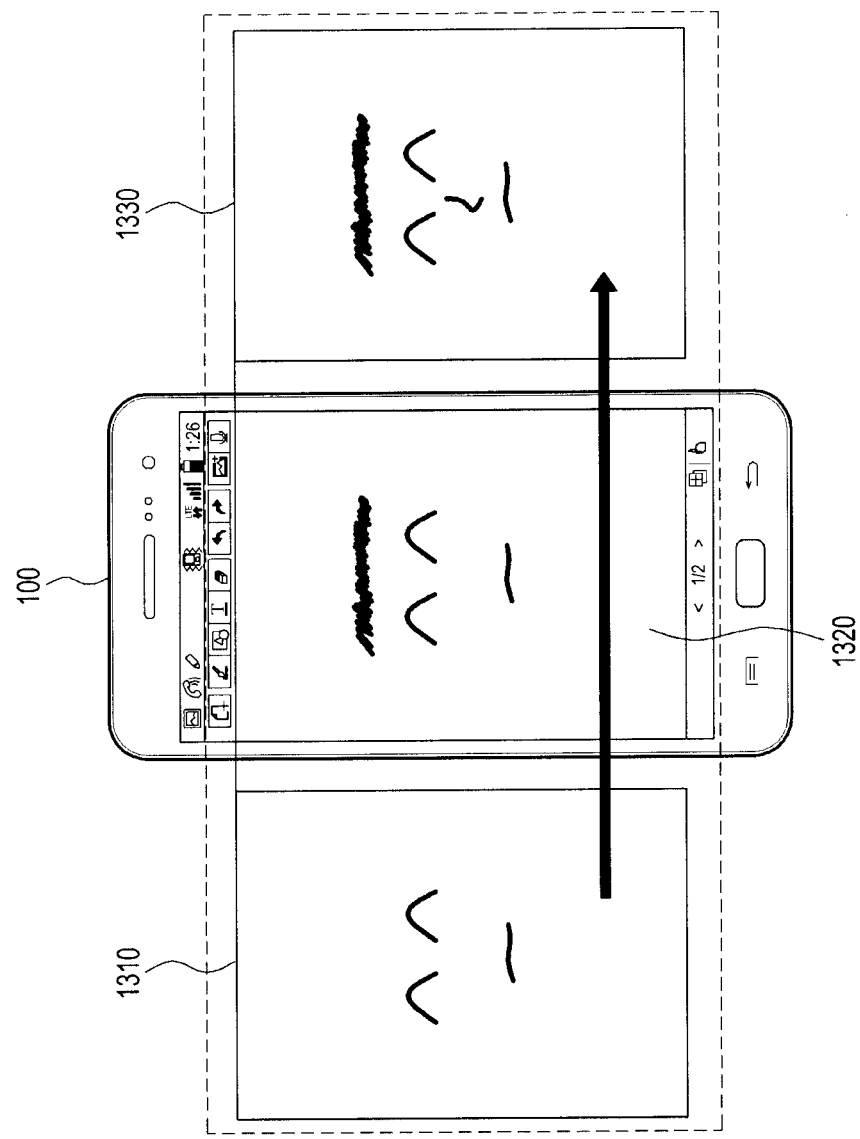
FIG. 13 shows an example of a technique for presenting content, according to an embodiment of the present invention.

Referring to FIG. 13, the first electronic device 100 may sequentially display (for example, slide) first content 1310 and at least one modified content 1320 and 1330 included in content-in-group information, based on content group information included in additional information of the first content 1310. At this time, an order in which the first content 1310 and the at least one modified content 1320 and 1330 included in the content-in-group information are displayed may be specified by a user, or according to a condition (for example, display in inverse order, display at random, etc.) specified by a user. Also, the order in which the first content 1310 and the at least one modified content 1320 and 1330 included in the content-in-group information are displayed may be identified according to a content attribute. The content attribute may be at least one of a time at which content is modified, an amount by which content is modified, a content rating, content views, a relationship between an original author and a secondary author of content, and a file size of content.

Referring to FIGS. 14A-B, the first electronic device 100 may display at least one content included in content-in-group information based on content group information in additional information of first content, using a continuous playback method. For example, if content includes information for reproducing a creation process, the first electronic device 100 may display a playback button 1450 for reproducing one content 1410 of at least one content included in the content-in-group information, as shown in FIG. 14A. If the playback button 1450 is selected by a user, a process in which the content 1410 is drawn may be reproduced and displayed, as shown in FIG. 14B.

Referring to FIGS. 15A-C, the playback button 1450 may be provided for each of at least one content included in the content-in-group information. For example, in the case of original content 1510 as shown in FIG. 15A, a process in which two eyes 1511 and 1512 are drawn and a process in which lips 1513 are drawn may be reproduced. According to an embodiment, in the case of first modified content 1520 in which hair 1522, that is, a first modified part 1522 is included in the original content 1510 (for example, an image acquired by screen capturing), as shown in FIG. 15B, the original content 1510 may be displayed as a still image, and a process in which the hair 1522 is additionally drawn on the still image may be reproduced. Also, in the case of second modified content 1530 in which a nose 1532, that is, a second modified part 1532 is included in the first modified content 1520 (for example, an image acquired by screen capturing), as shown in FIG. 15C, the first modified image 1520 may be displayed as a still image, and a process in which the nose 1532 is additionally drawn on the still image may be reproduced. Additionally or alternatively, if the second modified content 1530 includes information for reproducing an entire creation process, the first electronic device 100 may continuously reproduce all information of the second modified content 1530. For example, the first electronic device 100 may continuously reproduce the eyes 1511 and 1512, the lips 1513, the hair 1522, and the nose 1532 included in the second modified content 1530 in the order in which they were drawn.

According to an embodiment, if the first electronic device 100 receives a user input of requesting the first electronic device 100 to reproduce the entire or a part of at least one content included in content-in-group information in order, the first electronic device 100 may continuously reproduce the entire or a part of the at least one content included in the content-in-group information in order. For example, the first electronic device 100 may reproduce the first content 1510 (for example, the eyes 1511 and 1512 and the lips 1513), and successively reproduce the first modified content (for example, the hair 1522) 1520 and the second modified content (for example, the nose 1532) 1530, based on the content group information. According to an embodiment, in order to receive user input of requesting the first electronic device 100 to reproduce at least one content included in the content-in-group information, the first electronic device 100 may provide a content group playback menu. Also, the first electronic device 100 may provide a menu for acquiring a user input of requesting the first electronic device 100 to reproduce a part of the at least one content included in the content-in-group information.

According to another embodiment, the first electronic device 100 may display at least one content with regard to a modification performed on the original content to produce the first content, in a tree structure, using the first content and the additional information of the first content.

Figure 16:
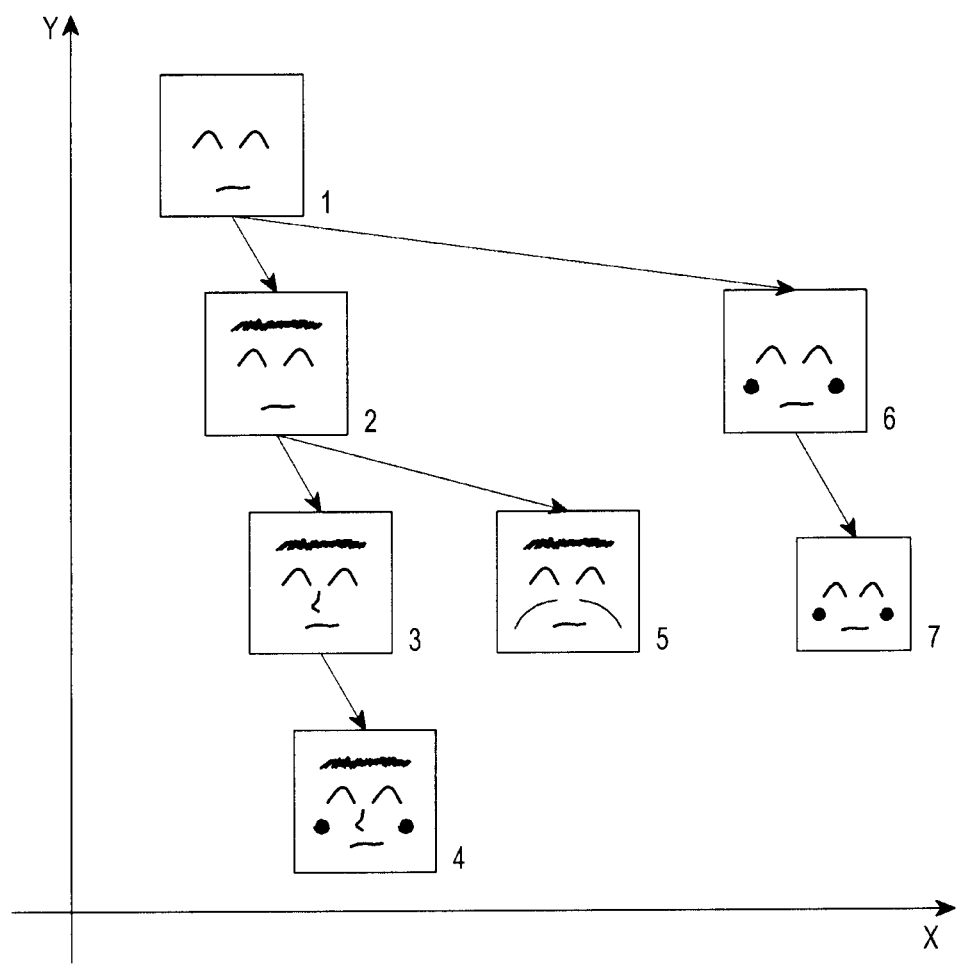
FIG. 16 shows an example in which content group information according to an embodiment of the present invention is displayed in a tree structure.

FIG. 16 shows an example of a relationship diagram of content group information according to an embodiment of the present disclosure. Referring to FIG. 16, a relationship diagram of content group information may be expressed in a tree structure of at least one content based on x- and y-axes with regard to a modification performed on the original content to produce first content.

The first electronic device 100 may represent a degree of closeness to the original content on the y-axis, and represent a content attribute on the x-axis. Also, the first electronic device 100 may represent based on which content each content is modified through branches (lines) between content 1 to 7. The content attribute may be at least one of a time at which content is modified, an amount by which content is modified, a content rating, content views, a relationship between an original author and a secondary author of content, and a file size of content. For example, if the content attribute is a time at which content is modified, the greater x-axis value the content has, the more lately modified content the content may be. If the content attribute is an amount by which content is modified, the greater x-axis value the content has, the larger part of the content may be modified. If the content attribute is a content rating, the greater x-axis value the content has, the higher rating the content may have. If the content attribute is content views, the greater x-axis value the content has, the more views the content may have. If the content attribute is a relationship between an original author and a secondary author of content, the greater x-axis value the content has, the closer relationship between an original author and a secondary author the content may have. If the content attribute is a file size of content, the greater x-axis value the content has, the larger file size the content may have.

According to some embodiments, when a tree structure of at least one content is displayed, the first electronic device 100 may select some content according to a user input, and display the selected content sequentially. According to some embodiments, the relationship diagram of the content group information may be displayed in another form, such as a Venn diagram, a folder, or a list.

Figure 17:
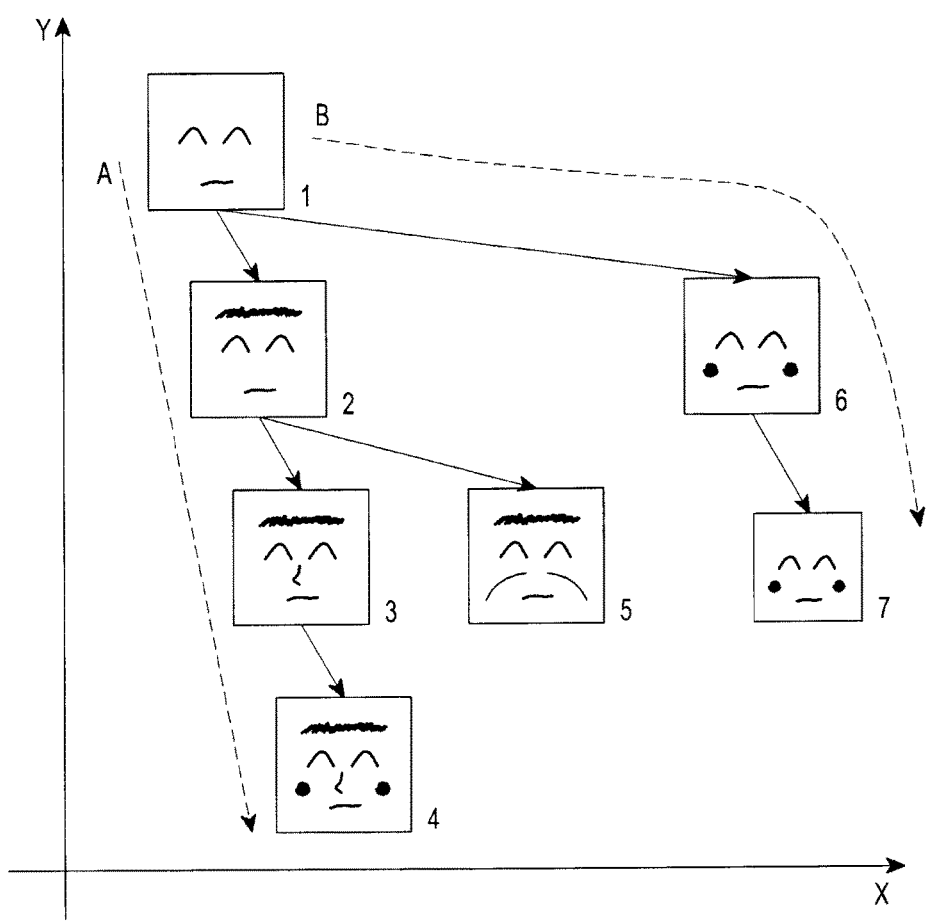
FIG. 17 is a view of an example of an operation of selecting a part of content when at least one manipulated content is displayed in a tree structure, according to an embodiment of the present invention.

FIG. 17 is a view for describing operation of selecting a part of content when at least one modified content is displayed in a tree structure, according to an embodiment of the present disclosure. Referring to FIG. 17, if a user input of selecting content 1, 2, 3, and 4 as indicated by an arrow A is received when a tree structure of at least one modified content is displayed, the first electronic device 100 may select the content 1, 2, 3, and 4 sequentially. Or, if a user input of selecting content 1, 6, and 7 as indicated by an arrow B is received, the first electronic device 100 may select the content 1, 6, and 7 sequentially. Also, if a user input of requesting selection of direct-line content of content 3 is received, the first electronic device 100 may select the content 1, 2, and 3 that are direct-line content of the content 3.

According to various embodiments of the present disclosure, since a user can know an original author and a modified author of content when the content is provided, it is possible to protect rights of the original author of the content. Also, according to various embodiments of the present disclosure, since a user can know which part of original content is modified by what person when content modified from the original content is provided, the user can easily identify content authors.

The operations according to the various embodiments of the present disclosure may be implemented in the form of program instructions that can be performed through a variety of computer means, and recorded in a computer-readable medium. The computer-readable medium may include, alone or in combination with the program instructions, data files, data structures. The program instructions recorded in the computer-readable medium may be things designed and constructed specifically for the present disclosure or known to those skilled in the art in the field of computer software.

The content providing method according to the embodiments of the present disclosure may be implemented in the form of hardware, software, or a combination of hardware and software. The software may be stored in a volatile or non-volatile memory device such as, for example, a Read-Only Memory (ROM), regardless of whether it is erasable or re-writable, in a memory such as, for example, a Random Access Memory (RAM), a memory chip, and an Integrated Circuit (IC), or in an optically/magnetically recordable and machine (e.g., a computer)-readable storage medium such as, for example, a Compact Disk (CD), a Digital Versatile Disk (DVD), a magnetic disk, and a magnetic tape. The content providing method according to the embodiments of the present disclosure may be implemented as a computer or electronic device including a controller and a memory, and the memory is an example of a machine-readable storage medium suitable to store one or more programs, including instructions implementing embodiments of the present disclosure. Therefore, the embodiments of the present disclosure may include programs including codes for implementing the devices and methods as set forth in the appended claims of the specification, and a machine (e.g., a computer)-readable storage medium storing these programs. These programs may be electronically transferred through any media and equivalents thereof, such as communication signals, which are transferred through wired or wireless connections.

Also, the electronic device according to the embodiments of the present disclosure may receive and store the programs from a program providing apparatus connected in a wired/wireless fashion. The program providing apparatus may include a memory for storing a program including instructions instructing execution of the content providing method according to the various embodiments of the present disclosure, a communication unit for performing wired/wireless communication with the electronic device, and a controller for transmitting the corresponding program through the communication unit according to a request from the electronic device or automatically.

The invention claimed is:

1. An electronic device comprising:
a display unit;
a communication unit;
a memory; and
at least one processor operatively coupled to the memory, wherein the memory stores instructions that, when executed, cause the at least one processor to:
transmit, via the communication unit, a first content item including first content to an external device;
receive, via the communication unit, at the electronic device from the external device, a second content item including additional information associated with the first content, wherein:
when a watermark is not in the first content item, the additional information includes user information associated with the electronic device as an original author of the first content, and
when the watermark is in the first content item and author information in association with the watermark is different from the user information associated with the electronic device, the additional information includes the user information associated with the electronic device as a secondary author of the first content; and
display the second content item on the display unit.

2. The electronic device of claim 1, wherein displaying the second content item includes displaying a first identification indicating the original author and/or a second identification indicating the secondary author.

3. The electronic device of claim 1, wherein the second content item includes the first content of the original author and a modified first content of the secondary author.

4. The electronic device of claim 3, wherein displaying the second content item includes displaying the first content of the original author or the modified first content of the secondary author.

5. The electronic device of claim 3, wherein the instructions, when executed, cause the at least one processor further to: acquire relationship diagram information based on the additional information and a content attribute, the relationship diagram information indicating a relationship between the first content of the original author and the modified first content of the secondary author with respect to the content attribute.

6. The electronic device of claim 5, wherein the content attribute includes at least one of a time when the first content is modified, a size of data added to the first content when the first content is modified, a content rating, an indication of a relationship between the original author and the secondary author, and a size of the first content.

7. The electronic device of claim 5, wherein the first content and the modified first content are displayed based on the relationship diagram information.

8. The electronic device of claim 3, wherein displaying the second content item includes displaying the first content and the modified first content in sequence.

9. The electronic device of claim 1, wherein when the watermark is in the first content item, a notification message is transmitted to an author corresponding to author information in association with the watermark.

10. A method of receiving content in an electronic device, comprising:
- transmitting, to an external device, a first content item including first content;
- receiving, at the electronic device from the external device, a second content item including additional information associated with the first content, wherein:
- when a watermark is not in the first content item, the additional information includes user information associated with the electronic device as an original author of the first content, and
- when the watermark is in the first content item and author information in association with the watermark is different from the user information associated with the electronic device, the additional information includes the user information associated with the electronic device as a secondary author of the first content; and
- displaying the second content item.

11. The method of claim 10, wherein the second content item includes the first content of the original author and a modified first content of the secondary author.

12. The method of claim 11, wherein displaying the second content item includes displaying the first content or the modified first content.

13. The method of claim 10, wherein:
- the second content item includes the first content of the original author and a modified first content of the secondary author, and
- the additional information includes relationship diagram information indicating a relationship between the first content and the modified first content with respect to a content attribute.

14. The method of claim 13, wherein the content attribute includes at least one of a time when the first content is modified, a size of data added to the first content when the first content is modified, a content rating, an indication of a relationship between the original author and the secondary author, and a size of the first content.

15. The method of claim 10, wherein displaying the additional information further includes displaying a first identification indicating the original author and/or a second identification indicating the secondary author.

16. The method of claim 10, wherein when the watermark is in the first content item, a notification message is transmitted to an author corresponding to the author information in association with the watermark.

17. A non-transitory computer-readable storage medium storing one or more programs comprising instructions which, when executed by an electronic device, cause the electronic device to execute the method according to claim 10.

18. An electronic device comprising:
- a communication unit;
- a memory; and
- at least one processor operatively coupled to the memory, wherein the memory stores instructions that, when executed, cause the at least one processor to:
  - receive, via the communication unit from an external device, a first content item including first content and user information associated with the external device,
  - when a watermark is not in the first content item, include the user information associated with the external device as an original author in additional information,
  - when the watermark is in the first content item and author information in association with the watermark is different from the user information associated with the external device, include the user information associated with the external device as secondary author in the additional information, and
  - transmit, via the communication unit, to the external device, a second content item including the additional information associated with the first content.

19. The electronic device of claim 18, the at least one processor further to:
- when the watermark is in the first content item, transmit a notification message to an author corresponding to the author information in association with the watermark.

20. The electronic device of claim 18, wherein the second content item includes the first content of the original author and a modified first content of the secondary author.

21. The electronic device of claim 20, wherein the instructions, when executed, cause the at least one processor further to: generate the additional information including relationship diagram information using a content attribute associated with the first content.

22. The electronic device of claim 21, wherein the content attribute includes at least one of a time when the first content is modified, a size of data added to the first content when the first content is modified, a content rating, an indication of a relationship between the original author and the secondary author, and a size of the first content.

* * * * *